United States Patent

[11] 3,630,621

| [72] | Inventor | John W. Liskowitz<br>Belle Meade, N.J. |
|---|---|---|
| [21] | Appl. No. | 774,893 |
| [22] | Filed | Nov. 12, 1968 |
| [45] | Patented | Dec. 28, 1971 |
| [73] | Assignee | American Standard Inc.<br>New York, N.Y.<br>Continuation-in-part of application Ser. No. 629,568, Apr. 10, 1967, now abandoned. This application Nov. 12, 1968, Ser. No. 774,893 |

[54] MEASUREMENT OF VISIBILITY THROUGH A FLUID USING POLARIZED LIGHT
3 Claims, 4 Drawing Figs.

[52] U.S. Cl................................................. 356/104,
 250/218, 250/225, 356/114, 356/118
[51] Int. Cl............................................G01n21/00,
 G01n 21/40
[50] Field of Search........................................... 356/37, 38,
 102–104, 114–119, 204, 207, 208; 250/218

[56] References Cited
UNITED STATES PATENTS

| 1,644,330 | 10/1927 | Exton............................. | 356/103 |
|---|---|---|---|
| 2,481,034 | 9/1949 | Neufeld......................... | 250/218 X |
| 2,877,683 | 3/1959 | Fischer.......................... | 250/218 X |
| 3,146,293 | 8/1964 | Lesage .......................... | 250/218 X |
| 3,283,644 | 11/1966 | Saltzman....................... | 356/114 |
| 3,302,293 | 2/1967 | French .......................... | 356/11 X |
| 3,373,652 | 3/1968 | Flader........................... | 356/115 X |
| 3,412,253 | 11/1968 | Marcus.......................... | 356/103 X |
| 3,420,609 | 1/1969 | Kozawa......................... | 356/104 |
| 3,446,558 | 5/1969 | Seaton........................... | 356/104 |
| 3,450,477 | 6/1969 | Meltzer......................... | 356/114 |

OTHER REFERENCES

Weissberger, Phys. Meth. of Org. Chem., V. I, Interscience Pub., N.Y., 1960, pp. 2,125– 2,128.

George et al., Phys. Rev. Letters, V. 11, N. 9, Nov. 1, 1963, pp. 403– 406

*Primary Examiner*—Ronald L. Wibert
*Assistant Examiner*—Warren A. Sklar
*Attorneys*—Sheldon H. Parker, Tennes I. Erstad and Robert G. Crooks

ABSTRACT: The visibility through a turbid fluid media is determined by measuring the depth of penetration of a beam of polarized light into the fluid media. The depth of penetration is determined by varying the focal distance or optical path length until the depolarization of the incident polarized light by the particles in the fluid remains constant.

MEASUREMENT OF VISIBILITY THROUGH A FLUID USING POLARIZED LIGHT

CROSS-REFERENCE TO RELATED APPLICATIONS

This application is a continuation-in-part of U.S. Pat. application, Ser. No. 629,568, filed Apr. 10, 1967, now abandoned in favor of Ser. No. 775,093, filed Nov. 13, 1968.

BACKGROUND OF THE INVENTION

1. Field of Invention

This invention relates to the determining of the turbidity or visibility through a fluid medium, and more particularly to the use of polarized light and a backscattering measuring technique in order to ascertain the turbidity or visibility through a fluid.

2. Prior Act

The turbidity in a liquid medium is conventionally determined by measuring the percent of incident light which is transmitted through the media under consideration. Typically, a fixed path length is employed. The results of such measurements are strongly influenced by fluctuations in the source intensity and by buildup of solid materials upon optical surfaces, therefore leading to inaccuracies.

Typically, visibility measurements involve visually observing the maximum distance at which objects of a particular size are visible. At airports, determinations of visibility are made along the ground rather than along the flight path, since it is not possible to fix solid objects in the path of aircraft. Obviously, the visibility determinations give only approximations of the actual information required since the actual visibility condition desired is not being measured directly.

Copending U.S. Pat. applications, Ser. No. 775,093, filed Nov. 13, 1968, and Ser. No. 774,893, filed Nov. 12, 1968, teach that plane and circularly polarized light can be used to determine the concentration of solids suspended in a fluid.

SUMMARY OF THE INVENTION

It has now been found that the point where complete altenuation of a beam of incident polarized light occurs is directly related to the depth of penetration of the light into a turbid medium. This point is measured by directing a beam of polarized light at the fluid medium under analysis. A detector which responds to the degree of depolarization of light which is backscattered at a particular angle by particles suspended in the fluid is directed along the path of the incident beam until the degree of depolarization no longer changes. At this point, complete altenuation of the incident radiation is indicated.

BRIEF DESCRIPTION OF THE DRAWING

The objects and advantages of the invention will become evident and the invention will be more fully understood from the following description when read in conjunction with the drawings herein.

DESCRIPTION OF THE PREFERRED EMBODIMENTS

Figure 1:
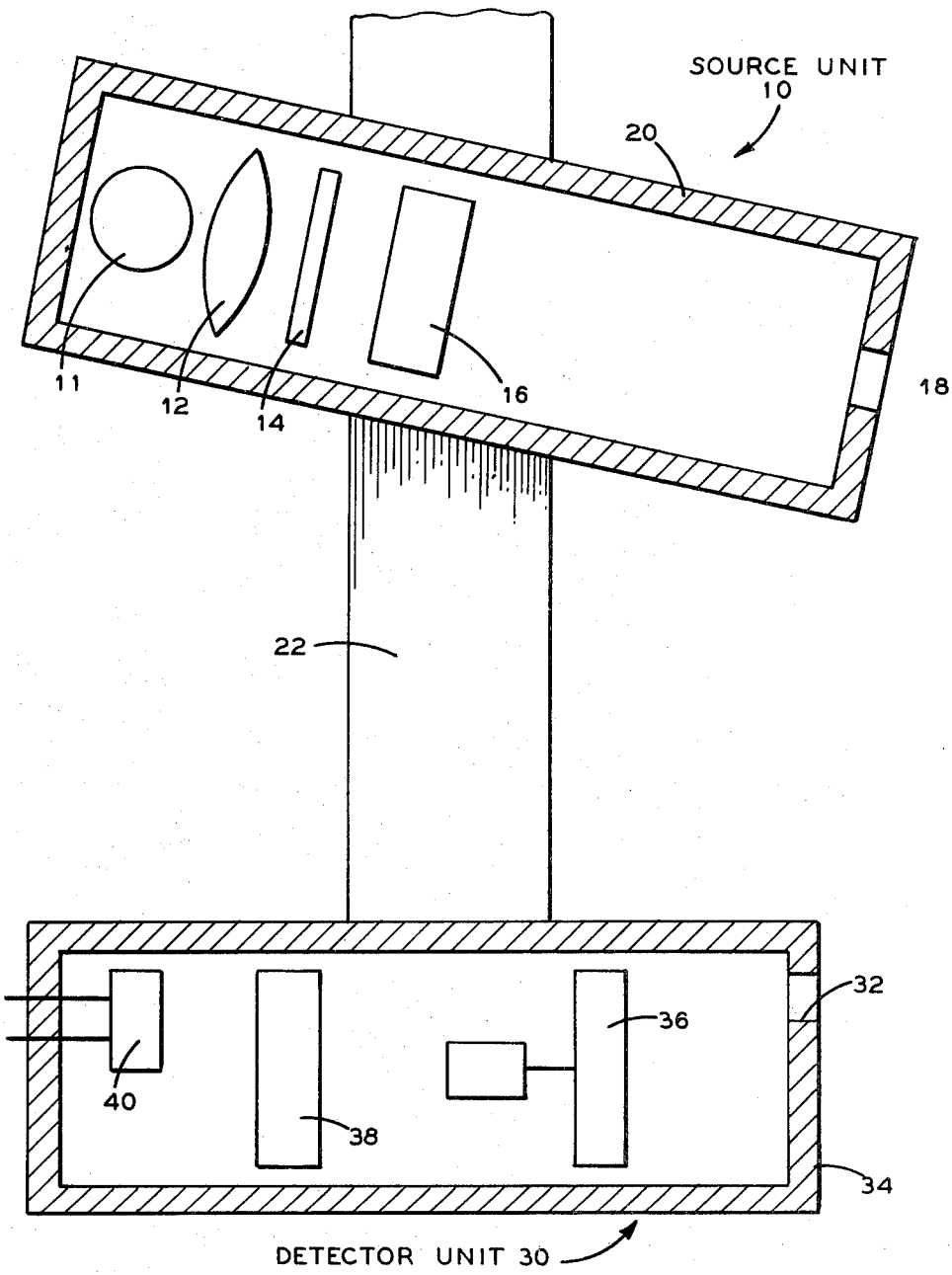
FIG. 1 is a schematic representation of an apparatus in accordance with the present invention.

As shown in FIG. 1, a source unit 10 is mounted on a carrier 22 which is provided with means to permit movement of the source unit 10 along the carrier 22, as will be explained in more detail herein after.

The source unit 10 includes a housing 20, a light source 11, a light filter 14, and a polarizer 16. The light from the source 11 such as a mercury, tungsten, or xenon lamp, passes through the monochromatic filter 14 thus limiting the light to a relatively narrow range of wavelengths. Alternatively, the light source can be one which produces only a desired wavelength, or filters can be used in the detector unit 30 to restrict the light to monochromatic light.

It should be understood that the monochromatic light filter can be positioned anywhere between the light source 11 and the detector 40. In a system which employs a pair of analyzers and detectors, it is obviously most advantageous to employ the filter between the light source and the sample rather than between the sample and the detector because in the former case, only a single filter unit is required; whereas in the latter case, a pair of equivalent units is required. Differences in the light transmission characteristics in the two filter units will introduce errors into the system.

While the use of monochromatic light is preferred, polychromatic light can be used without filtering. If light of multiple wavelengths is used, however, the maximum wavelength should be comparable in length to the diameter of the particles being measured in order to produce the best results.

A collimating lens 12 is employed in order to regulate the width of the incident light produced by the light source 12.

After passing through the filter 14, the light is plane polarized by means of a conventional polarizer 16. Polaroid filters, Nicol, Glan and Rochon prisms are suitable for polarizing the incident radiation.

A variable or fixed exit slit 18 is employed for further restricting the width of the incident beam.

A plane polarized laser beam can be employed in place of the type of system heretofore described for applications in which the distance between the source unit 10 and the region under analysis is very great.

The detector unit 30 includes an entrance slit 32 to the housing 34, a rotatably mounted quartz plate 36, an analyzer 38, and a detector 40. The analyzer 38 permits the passage of light having its axis along a particular plane either parallel to that of the polarized incident beam or perpendicular thereto, while the detector 40 indicates the intensity of the light passing through the analyzer 38. The quartz plate 36 is employed in order to rotate the plane of the light impinging upon the analyzer 38 in order to permit the same analyzer and detector to be used for determination of both $E_\perp$ and $E_\parallel$.

It should be understood that various other combinations of elements can be employed, for example, a pair of detector units can be employed, one for the $E_\perp$ measurement and the other for the $E_\parallel$ measurement, with a beam splitting being used to divide the scattered light into two equivalent units. The various combinations are described more fully in copending U.S. Pat. applications, Ser. No. 629,568, filed Apr. 10, 1967, now abandoned, and Ser. No. 775,093, filed Nov. 13, 1968.

As described in copending U.S. Pat. application, Ser. No. 774,895, filed Nov. 12, 1968, circularly polarized light can be used in place of plane polarized light.

Figure 2:
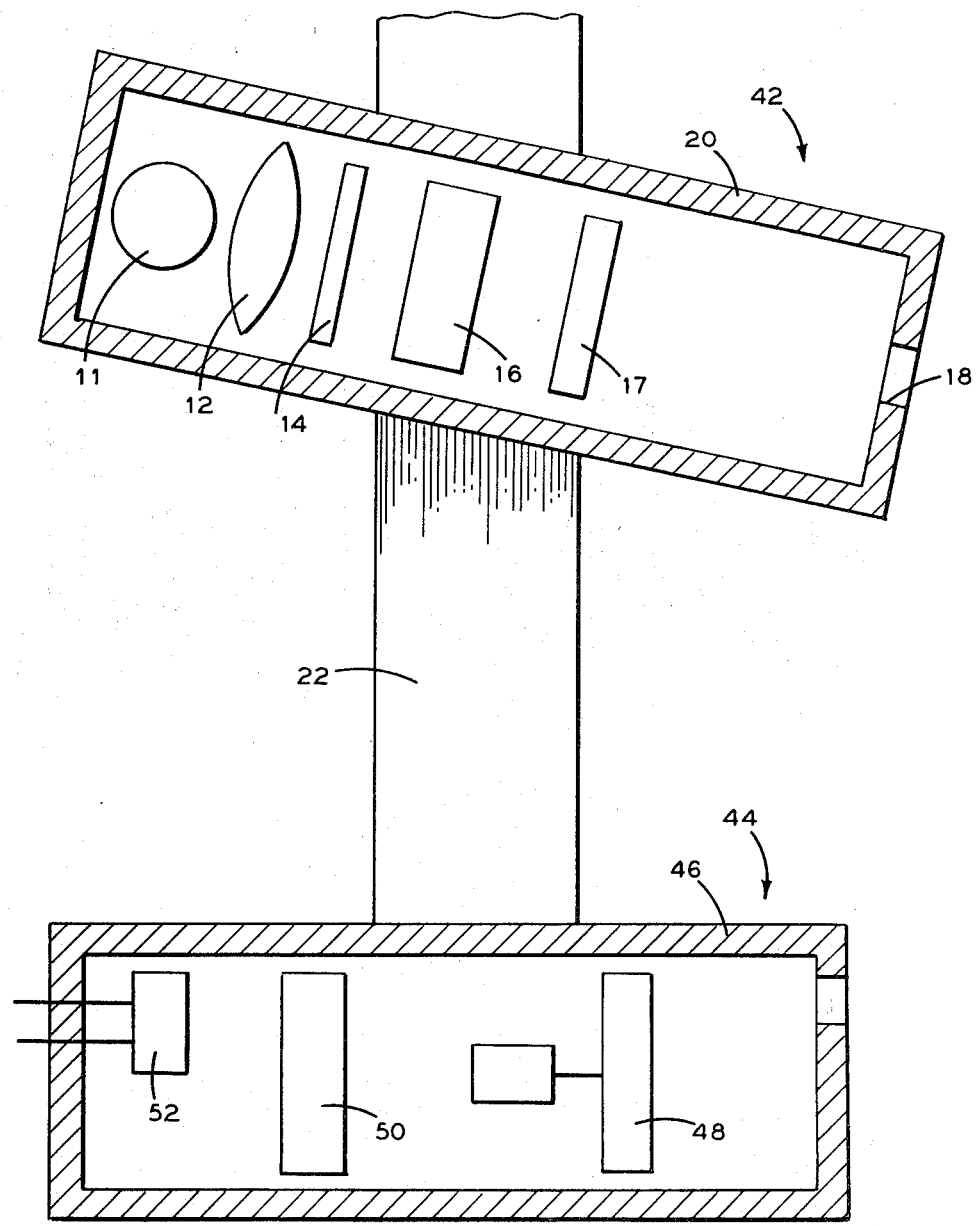
FIG. 2 is a schematic representation of another modification of an apparatus.

As shown in FIG. 2, the source unit 42 contains a light source 11, a collimating lens 12, a filter 14 and a plane polarizer 16, which correspond to the respective elements of the source unit 10 to FIG. 1.

Additionally, however, quarter wave plate 17 is used in order to circularly polarize the light transmitted through the plane polarizer 16. As shown in FIG. 2, the light, which is scattered by the fluid medium under analysis, enters the detector 44 and is passed through a quarter wave pate 48 which is of the same "handedness" as the quarter wave plate 17. The plate serves to convert the scattered right circularly polarized light (RCPL) to plane polarized light (PPL) whose plane is perpendicular to the plane of the polarized light resulting from the conversion of the left circularly polarized light to plane polarized light. It should be noted that a quarter wave plate 17 which produces left circularly polarized light can be used just as readily as a plate which produces right circularly polarized light. An analyzer 50 is employed which, depending upon its orientation, will either transmit light which is vibrating in a plane parallel or perpendicular to the plane of the incident polarized light from the polarizer 16. The amount of energy of the light which passes through the analyzer 50 is measured by means of a detector 52.

The measurement process is directly related to the process used with plane polarized light as disclosed in copending U.S. Pat. application, Ser. No. 629,568, now abandoned.

As previously noted with regard to the structure of FIG. 1, two simultaneous readings can be taken by employing two equivalent sets of measuring units. Both units must be positioned at the exact same angle $\theta$ from the direction of the source of the light. The analyzer of one unit can then be oriented so as to permit the passage of light which is perpendicularly oriented with respect to the plane of the light of the polarizer 16 ($E_\perp$) while the analyzer of the other unit permits the passage of light which is oriented in a plane parallel with respect to the plane of light from the polarizer 16 ($E_\parallel$). The first detector could then measure light which changed from right circularly polarized light to left circularly polarized light as a result of single or primary scattering and one-half of the intensity of the light which results from multiple scattering, while the second detector could serve to indicate one-half of the intensity of the light which results from multiple scattering.

Inasmuch as differences between the orientation of the two detector units can produce errors and the necessity to rotate the analyzer 50 or the quarter wave plate 48 in the system shown in FIG. 2 prevents simultaneous readings of $E_\parallel$ and $E_\perp$ a beam splitter can be employed as shown previously noted with regard to FIG. 1.

A further alternative which can be employed, and is shown in FIG. 1, is to use a member such as a quartz crystal which rotates light.

The member can be positioned between the analyzer 50 and the quarter wave plate 48. With the member in this position, the effect would be to cause a rotation of the light from the quarter wave plate 48. Removal of the member permits the direct transmittal of the light from the quarter wave plate 48 to the analyzer 50. In the first case, the light whose plane is parallel to the plane of the analyzer 50 is precluded from passing through the analyzer 50 because of the rotation induced by the inserted member. When the member is removed from the position between the quarter wave plate 48 and the analyzer 50, the light which is in a plane perpendicular to the plane of the analyzer 50 is precluded from passing through the analyzer.

Total scattered radiation is measured by taking a reading with the analyzer 50 (or analyzer 38, in the case of the FIG. 1 structure) removed so that $E_\parallel$ and $E_\perp$ are received by the detector simultaneously.

The use of circularly polarized light is more fully described in the previous noted U.S. Pat. application, Ser. No. 774,895.

The use of circularly polarized light as compared to plane polarized light has the advantage of yielding enhanced sensitivity. Circularly polarized light undergoes a phase change as a result of scattering, whereas plane polarized light undergoes depolarization.

The operation of the apparatus of the present invention involves moving the detector unit with respect to the source unit. Obviously, either unit can be fixed on the other unit mounted for accurately controlled, precise movement along the carrier 22.

Since the degree of depolarization changes with changes in the observation angle, it is advantageous to have the movable member, as for example the source unit 10 of FIG. 1, move without changing its angular relationship to the detector unit.

Figure 3:
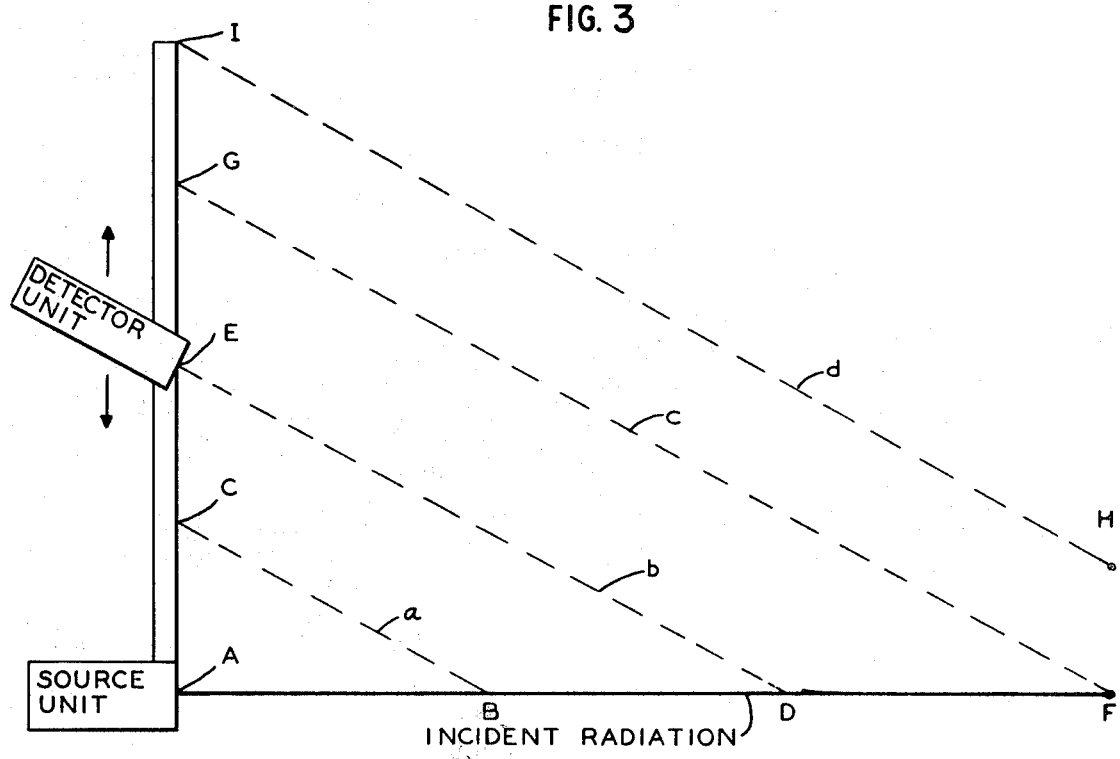
FIG. 3 is a schematic representation showing a use of the apparatus.

The well-known trigometric relationship is employed to determine the distance between the source A and the focal points A, B, D, F, and H. The observation angle $\theta$ can readily be measured as is the case for the varying distance between the source A and the detector positions C, E, G and I. Since the angle $\theta$ remains constant, the focal distances AB, AD, and AF, as shown in FIG. 3, can be determined directly from the distances AC, AE and AG.

Figure 4:
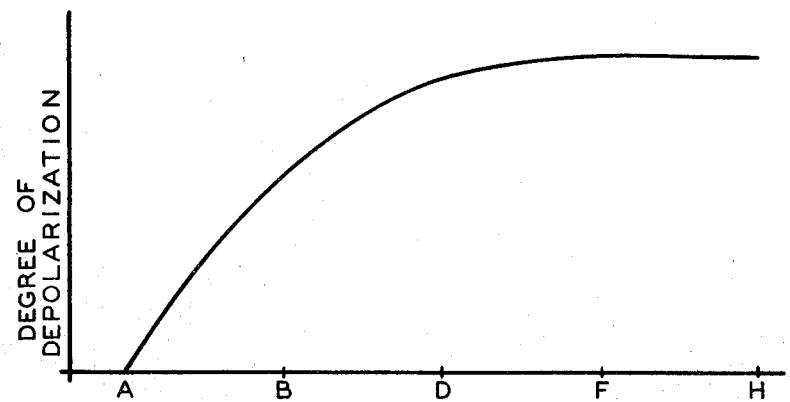
FIG. 4 is a graph which corresponds to the operation of FIG. 3.

As shown in FIG. 4, as the focal distance or optical path length is increased, the degree of depolarization increases. At point D on the graph, corresponding to focal point D of FIG. 3, the rate of change of the degree of depolarization begins to decrease and the after system is aimed at the focal point F; no further substantial change in the degree of depolarization is observed. The incident light is thus being completely attenuated and the system is, in effect, no longer "seeing" or focusing beyond point F.

The system of the instant invention not only can operate solely with backscattered light, but actually gives better results with increasing observation angles.

Thus, the structure of FIG. 1, or that of FIG. 2, can be used at an airport with the source unit 10 aimed directly up the flight path of the airplanes, and the detector unit positioned to receive light scattered almost directly backwards. The instrument thus gives readings which correspond directly to the actual flying conditions.

In addition to the navigational type of applications of the instant invention, the system can also be used in the study of sunlight penetration into and dissipation within a stream in order to determine the amount of sunlight reaching the various organisms and the floor of a river.

Although the invention has been described in its preferred forms with a certain degree of particularity, it is understood that the present disclosure of the preferred forms has been made only by way of example, and that numerous changes in the details of construction and the combination and arrangement of parts may be resorted to without departing from the spirit and the scope of the invention.

GLOSSARY OF TERMS

Backscattering—The phenomena of the light having its direction of travel changed by more than 90° from the direction of travel of the incident light.

Multiple Scattering—The scattering of light by a plurality of particles so that the light changes its direction of travel more than once.

Primary Scattering—The scattering of light off a single particle so that the direction of travel is changed only once.

Analyzer—A device, such as a polarizer prism or a polarizing filter which can isolate the component in scattered light vibrating either parallel or perpendicular to the axis of the polarized light. A polarizer prism functions by absorbing the undesired light.

Detector—A device which is used in measuring the intensity of light transmitted from the analyzer. A photocell or photomultiplier can be used.

Quarter Wave Plate—A device which can convert plane polarized light into either right or left polarized light or right or left circularly polarized light into plane polarized light.

Light—A form of radiant energy, which include ultraviolet, visible and infrared radiation.

$E_\parallel$ —The intensity of the component of light having its optical axis parallel to the axis of the incident polarized light.

$E_\perp$—The intensity of the component of light having its optical axis perpendicular to the axis of the incident polarized light.

$E_T$—Intensity of the total scattered light ($E_\parallel + E_\perp$).

Degree of Depolarization — Typically refers to the ratio of $E_\perp/E_\parallel$, although other ratios can be used.

$E_{Polarized}$—Intensity of plane polarized light. ($E_\parallel - E_\perp$)

$E_{Depolarized}$—Intensity of depolarized light ($2 \times E_\perp$)

$E_{Multiple}$—Intensity of circularly polarized light which has undergone primary scattering.

$E_{Primary}$—Intensity of circularly polarized light which has undergone primary scattering.

Observation Angle—The angle formed by the path of the incident polarized light and the scattered light which is being observed: Light which is transmitted directly through a medium would be observed at an angle of 0°, while the angle for light which is back scattered to the maximum extent is 180°.

Suspended Solids—Any coherent particles, liquid, solid or gaseous bubbles, which are suspended in a fluid or vacuum, provided there is a difference between the refractive index of the particles and the fluid.

The phraseology, and definitions employed herein, are for the purposes of description and enhancing the understanding of the invention rather than for the purpose of establishing limitations of the invention.

What is claimed is:

1. The method of determining the depth of light penetration through a fluid medium which contains suspended particles having a refractive index different from that of the fluid medium, comprising:

a. projecting into said fluid medium, an incident beam of polarized light having a first plane of polarization, whereby light will be backscattered by particles in the fluid medium, said backscattered light having a first component having its plane of polarization parallel to the first plane of polarization of the incident beam of polarized light and a second component having its plane of polarization perpendicular to the first plane of polarization of the incident beam of polarized light;

b. measuring the intensity of the first and second components of the backscattered light at a plurality of points along said incident beam of polarized light in said fluid medium to produce a plurality of respective first and second measuring signals;

c. forming a plurality of ratios of said respective first and second measuring signals;

d. determining a point along said incident beam of polarized light where said ratios become substantially constant, thereby indicating the depth of penetration of said incident beam into said fluid medium.

2. The method of claim 1 wherein in step (b) the step of measuring comprises measuring said first and second components of said backscattered light which are backscattered at an angle greater than 170° with respect to the incident beam of polarized light.

3. The method of claim 1, wherein said step of projecting comprises projecting circularly polarized light, and wherein the step of measuring includes the step of converting backscattered circularly polarized light to plane polarized light.

* * * * *